No. 618,495. Patented Jan. 31, 1899.
H. COOPER.
DUMPING VEHICLE.
(Application filed Oct. 26, 1898.)
(No Model.) 2 Sheets—Sheet 1.
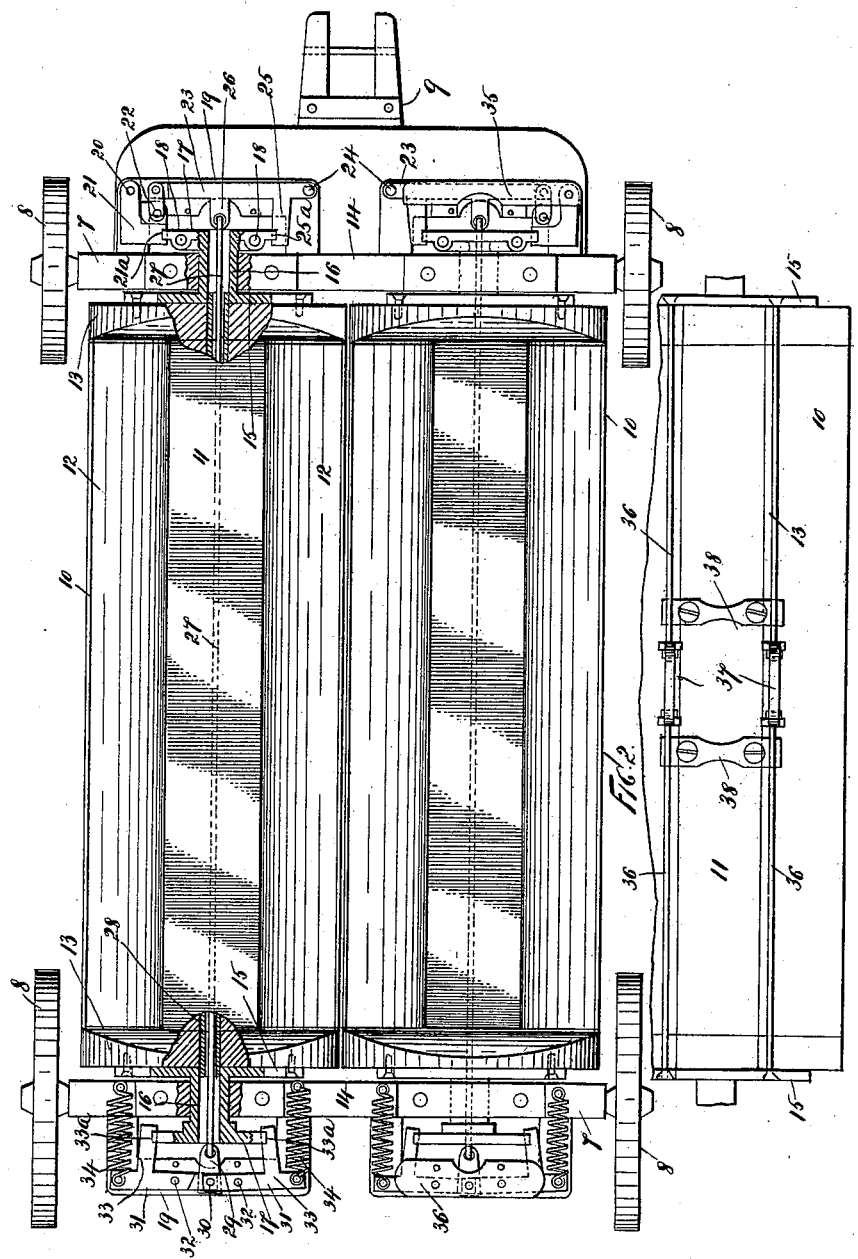

No. 618,495. Patented Jan. 31, 1899.
H. COOPER.
DUMPING VEHICLE.
(Application filed Oct. 26, 1898.)
(No Model.) 2 Sheets—Sheet 2.
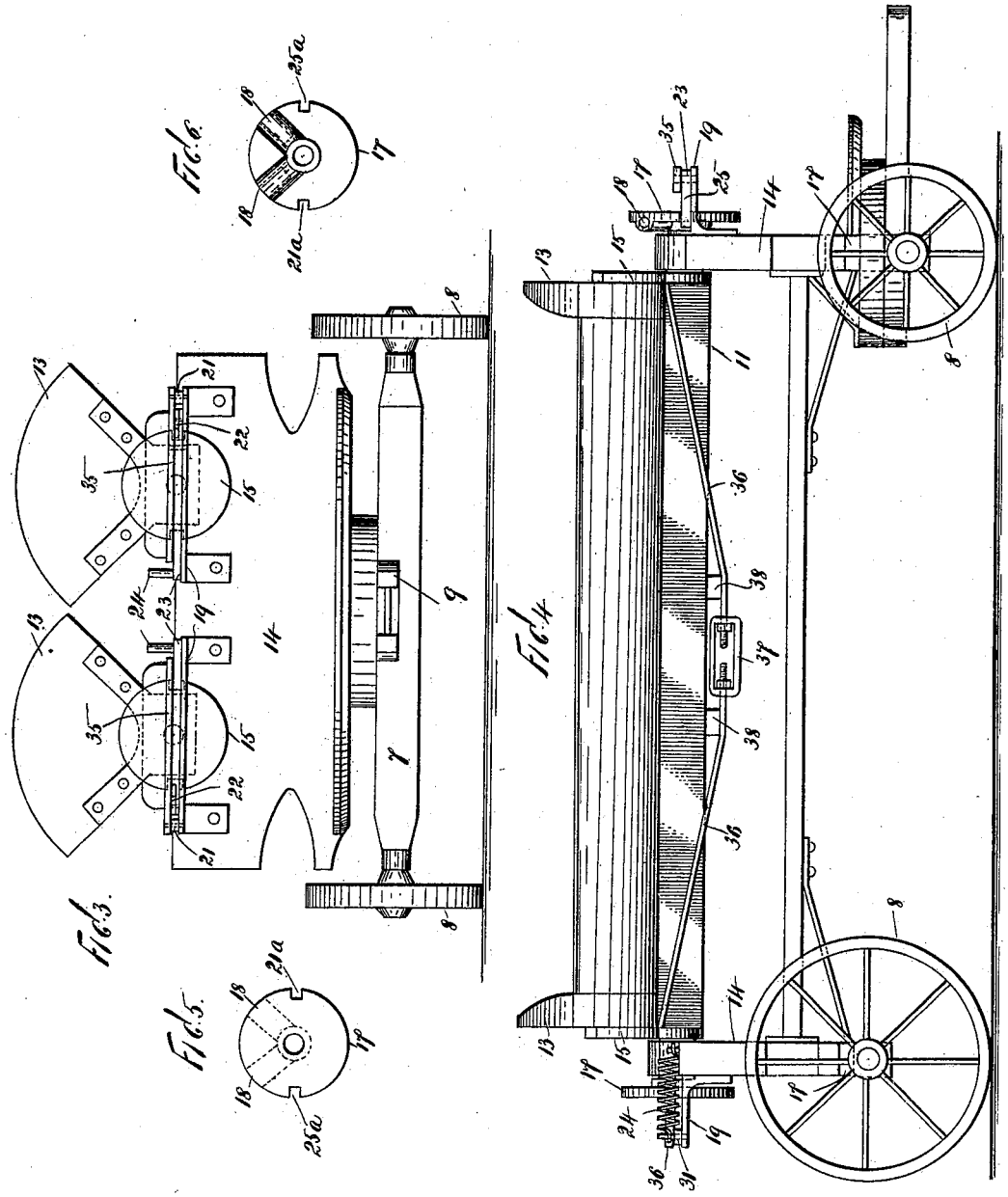
WITNESS
John Buckler,
T. A. Stewart.
INVENTOR
Harry Cooper,
BY
Edgar Tate & Co.
ATTORNEYS

UNITED STATES PATENT OFFICE.

HARRY COOPER, OF SAN ANTONIO, TEXAS.

DUMPING-VEHICLE.

SPECIFICATION forming part of Letters Patent No. 618,495, dated January 31, 1899.

Application filed October 26, 1898. Serial No. 694,574. (No model.)

*To all whom it may concern:*

Be it known that I, HARRY COOPER, a citizen of the United States, residing at San Antonio, in the county of Bexar and State of Texas, have invented certain new and useful Improvements in Dumping-Vehicles, of which the following is a full and complete specification, such as will enable those skilled in the art to which it appertains to make and use the same.

This invention relates to dumping cars, trucks, and similar articles; and the object thereof is to provide an improved vehicle of this class with one or more dumping beds or bodies with improved construction and improved means for dumping said beds or bodies when desired.

The invention is fully disclosed in the following specification, of which the accompanying drawings form a part, in which—

Figure 1 is a plan view of a vehicle embodying my invention and provided with two dumping beds or bodies, part of the construction being shown in section; Fig. 2, a bottom plan view of one of said beds or bodies, one side thereof being broken away; Fig. 3, an end view of the vehicle; Fig. 4, a side view thereof; and Figs. 5 and 6 are opposite views, respectively, of a detail of the construction.

In the drawings forming part of this specification the separate parts of my improvement are designated by the same numerals of reference in each of the views, and in Fig. 1 of the drawings I have shown a vehicle provided with two dumping beds or bodies, each of which is of the same form and construction, and in the following description only one of said beds or bodies and the operative mechanism connected therewith will be described in detail, it being understood that both of said beds or bodies and the operative mechanism connected therewith are exactly the same in construction and operation.

In Figs. 1 to 4, inclusive, I have shown a vehicle comprising axles 7, provided with the usual wheels 8, and the front of said vehicle, as shown in the drawings, is provided with a suitable device 9 for connecting a tongue therewith. The said vehicle, as shown in the drawings, is provided with two dumping beds or bodies 10, each of which consists of a bottom 11, outwardly-inclined sides 12, and ends 13, and mounted on the axles 7 at each end of the vehicle is an upright support 14, and each end of the beds or bodies is provided with a plate 15, which is secured thereto, each of which is provided with a tubular bearing 16, and said bearings 16 pass through the supports 14, and each of said bearings is provided at its outer end with a circular head 17, provided on its upper side with radial holes 18, adapted to receive the end of a bar or lever by means of which the bed or body is turned or dumped, as hereinafter described.

Connected with the supports 14 and inclosing the circular head 17 of the tubular bearings 16 are angular frames 19, and pivoted to the outer corner of the front angular frame 19, as shown at 20, is an angular locking-plate 21, the inner edge of which is adapted to enter a notch or recess 21ª in the perimeter of the adjacent circular head 17, and said angular plate is provided at its inner front corner with a notch or recess, in which is pivoted a link 22, to which is pivoted a lever 23, which extends longitudinally of the corresponding frame 19 and parallel with the corresponding support 14 and the free end of which is provided with a vertical pin 24, which serves as a handle by which said lever is operated, and said lever is provided adjacent to its free end with a backwardly-directed arm 25, which is adapted to enter a corresponding notch or recess 25ª formed in the perimeter of the adjacent circular head 17, as clearly shown in Fig. 1. The lever 23 is also provided centrally thereof with a backwardly-directed lug or projection 26, with which is connected a rod 27, which passes through the bottom portion 11 of the bed or body and through each of the tubular bearings 16, and said rod also passes through a tubular bearing 28, fixed in the bottom 11 of the bed or body and passing through the ends 13 thereof.

The rear end of the rod 27 is pivotally connected with a link 29, which is pivotally connected at 30 with the inner ends of two crank-levers 31, which are pivoted to the corresponding rear frame 19 at 32, and said crank-levers 31 are each provided with a forwardly-directed arm 33, and the arms 33 are adapted to operate in connection with corresponding notches or recesses formed in the adjacent circular head 17, as shown at 33ª. The crank-levers 31 are also each provided at its outer end with a contractile spring 34, and the inner ends of said springs are secured to the adjacent support 14, the object of said springs being to normally throw the inner ends of the lever 31 and the link 29 outwardly, so as to throw the arms 33 into the notches or recesses 33ª.

In practice the lever 23 at the front of the vehicle is preferably covered by a plate or shield 35, which serves to protect said lever, and the crank-levers 31 at the rear end of the vehicle are also covered by a shield or plate 36, which serves for a similar purpose, said shields or plates being both shown at the lower side of Fig. 1, but being omitted at the upper side of said figure in order to more clearly show the construction.

In practice in order to dump the bed or body all that is necessary is to take hold of the pin or handle 24 of the lever 23 and pull the free end of said lever outwardly. This operation will release both the arm 25 of said lever and the locking-plate 21 from the corresponding circular head 17, and at the same time the crank-levers 31 at the rear end of the vehicle will be operated by the rod 27 and the arms 33 thereof thrown outwardly and disconnected from the corresponding circular head 17, and the bed or body may then be turned in either direction either by taking hold of the side thereof or by inserting a bar or lever into the holes 18 of the forward circular head 17, and after said bed or body has been dumped it may be turned to its normal position and locked therein, the locking-plates 21 being thrown into position by the springs 34 to engage with the circular heads at each end of the vehicle to hold the bed or body in position till it is again desired to dump it.

It will be understood that after the bed or body has been dumped and returned to its normal position for loading the springs 34 at the rear end of the vehicle operate to automatically lock the bed or body and to hold it rigidly in position until it is desired to again dump the same.

I also provide a supplemental brace or support for the bottom of the bed or body, which comprises a truss-frame composed of parallel side rods 36, each of which is composed of two parts connected centrally by a turnbuckle 37, and the outer ends of these rods are connected with the plates 15, and the inner ends of the separate parts thereof pass through or beneath cross plates or stays 38, secured to the bottom of the bed or body adjacent to the middle thereof, and by means of this construction the bed or body is supported centrally, as will be readily understood.

An outside view of the circular head 17 of the front of the vehicle is given in Fig. 5 and an inside view thereof in Fig. 6, and, as shown in the front view, only the front circular head 17 is provided with the holes or openings 18, adapted to receive the end of a bar or lever for turning the bed or body; but it will be understood that the rear circular head 17 may be also similarly provided, if desired, and many other changes in and modifications of the construction herein described may be made without departing from the spirit of my invention or sacrificing its advantages.

Although I have shown my improvement applied to an ordinary wagon or truck, it will be apparent that said improvement may be applied to any desired form of vehicle, including railway-cars, and it will also be apparent that one or more of the beds or bodies 10 may be mounted on each vehicle and provided with the dumping mechanism hereinbefore described.

Having fully described my invention, I claim as new and desire to secure by Letters Patent—

1. A vehicle provided with a dumping bed or body having tubular bearings at each end thereof, which pass through supports at the ends of the vehicle, a rod mounted longitudinally of the bottom of the bed or body and passing at each end through said tubular bearings, circular heads connected with the outer ends of said tubular bearings, and locking devices suitably supported adjacent to said circular heads and adapted to engage therewith, said locking devices being in operative connection with said rod, and means for operating said locking devices, substantially as shown and described.

2. A vehicle provided with a dumping bed or body having tubular bearings at its opposite ends which pass through suitable supports connected with the axles of the vehicle, said tubular supports being each provided at its outer end with a circular head, a rod mounted longitudinally of the bottom of the bed or body, and passing at each end through said tubular bearings, pivoted locking devices at each end of the vehicle and in operative connection with said rod and adapted to engage with said circular heads, and means for operating said locking devices, substantially as shown and described.

3. A vehicle provided with a dumping bed or body, the central portion of which is supported by a truss-frame connected with the bottom and the ends thereof, said bed or body being also provided at each end with a tubular bearing, a rod mounted longitudinally of the bottom of said bed or body and passing through said tubular bearings, circular heads connected with the outer ends of said tubular bearings, locking devices pivotally supported adjacent to said circular heads and adapted to engage therewith, said locking devices being in operative connection with said rod, and one of said locking devices at one end of the vehicle, being adapted to operate all of said devices, substantially as shown and described.

4. A vehicle provided with a dumping bed or body, the central portion of which is supported by a truss-frame connected with the bottom and the ends thereof, said bed or body being also provided at each end with a tubular bearing, a rod mounted longitudinally of the bottom of said bed or body and passing through said tubular bearings, circular heads connected with the outer ends of said tubular bearings, locking devices pivotally supported adjacent to said circular heads and adapted to engage therewith, said locking devices being in operative connection with said rod, and one of said locking devices at one end of the vehicle, being adapted to operate all of said devices, the locking devices at the opposite end of the vehicle being spring-operated, substantially as shown and described.

5. A vehicle provided with a dumping bed or body having tubular bearings connected with the opposite ends thereof, and passing through supports connected with the axles of the vehicle, said tubular bearings being each provided at its outer end with a circular head, spring-operated crank-levers suitably supported at one end of the vehicle and adapted to engage with the adjacent circular head, a locking-plate pivotally supported at the opposite end of the vehicle and adapted to engage with the adjacent circular head, a lever pivotally connected with said locking-plate and provided with an arm which is also adapted to engage with said circular head, a rod mounted longitudinally of the bottom of the bed or body, and connected at one end with said last-named lever, and at the opposite end with said crank-levers, substantially as shown and described.

6. A vehicle provided with a dumping bed or body, provided at each end with a tubular bearing, a rod mounted longitudinally of the bottom of said bed or body and passing through said tubular bearings, circular heads connected with the outer ends of said tubular bearings, spring-operated locking devices pivotally supported at one end of the vehicle and adapted to engage with the adjacent circular head and with which said rod is connected, and locking devices pivotally supported at the opposite end of the vehicle and adapted to engage with the adjacent circular head, said last-named locking devices being also in connection with said rod, substantially as shown and described.

7. A vehicle provided with supports at each end, a dumping bed or body between said supports, and having tubular bearings at each end thereof rigidly secured thereto and passing through said supports, said bearings being each provided at its outer end with a circular head, and locking devices which are adapted to engage with said circular heads, and to be disconnected therefrom, substantially as shown and described.

8. A vehicle provided with supports at each end, a dumping bed or body mounted between said supports and having tubular bearings at each end thereof rigidly secured thereto and passing through said supports, said bearings being each provided at its outer end with a circular head, and locking devices which are adapted to engage with said circular heads and to be disconnected therefrom, one of said circular heads being provided with radial holes or openings adapted to receive a bar or lever, substantially as shown and described.

9. A vehicle provided with supports at each end, a dumping bed or body mounted between said supports and provided with a tubular bearing rigidly secured thereto and passing through one of said supports, the outer end of said bearing being provided with a circular head, and locking devices adapted to operate in connection with said circular head, substantially as shown and described.

10. A vehicle provided with supports at each end, a dumping bed or body mounted between said supports and having bearings at its opposite ends which pass through said supports, said bearings being each provided at its outer end with a head, and locking devices which are adapted to engage with said heads, said heads being also provided with radial holes or openings adapted to receive a bar or lever, substantially as shown and described.

11. A vehicle provided with supports at each end, a dumping bed or body mounted between said supports and having bearings at its opposite ends which pass through said supports, said bearings being each provided at its outer end with a head, and locking devices which are adapted to engage with said heads, and means for operating said locking devices, said heads being also provided with radial holes or openings adapted to receive a bar or lever, substantially as shown and described.

12. A vehicle provided with supports at each end, a dumping bed or body mounted between said supports and provided with bearings at its opposite ends which pass through said supports, said bearings being each provided at its outer end with a circular head, and locking devices which are adapted to engage with said heads and to be disconnected therefrom, means for operating said locking devices, said heads being also provided with radial holes or openings adapted to receive a bar or lever for turning said bed or body, substantially as shown and described.

In testimony that I claim the foregoing as my invention I have signed my name, in presence of the subscribing witnesses, this 18th day of October, 1898.

HARRY COOPER.

Witnesses:
GEORGE W. RUSS,
JOSEPH RYAN,
JULIUS CONRADS.